United States Patent [19]

Stuart

[11] Patent Number: 4,524,840

[45] Date of Patent: Jun. 25, 1985

[54] ELECTRONIC SCALE WITH NON-PARALLEL CAPACITANCE MEANS

[75] Inventor: James M. Stuart, Malvern, Pa.

[73] Assignee: Malvern Scale Company, Malvern, Pa.

[21] Appl. No.: 526,178

[22] Filed: Aug. 24, 1983

[51] Int. Cl.³ .............................................. G01G 3/14
[52] U.S. Cl. .............................. 177/210 C; 73/862.64
[58] Field of Search ................ 177/210 C; 73/862.64; 361/283, 278

[56] References Cited

U.S. PATENT DOCUMENTS 4,273,204  5/1978  Gillen ................................... 177/210
4,308,929  1/1982  Estavoyer ........................ 177/210 C

OTHER PUBLICATIONS

Stein, H. K., *Calculus and Analytic Geometry*, McGraw-Hill, New York, 2nd Edition, pp. 362-363.
Brookes-Smith, C. H. and Colls, J. A., "The Measurement of Pressure, Movement, Acceleration, and Other Mechanical Quantities by Electrostatic Systems", *Journal of Scientific Instruments*, v 16, No. 12, pp. 361-366.
Foldvari, T. L. and Lion, K. S., "Capacitive Transducers", *Instruments and Control Systems*, Nov. 1964, pp. 77-85.
Hetényi, M., *Handbook of Experimental Stress Analysis*, Wiley and Sons, New York, 1950, pp. 273-285, 298-300.
Neubert, H. K. P., *Instrument Transducers: An Introduction to Their Performance and Design*, Clarendon Press, Oxford, 2nd Edition, pp. 225-252.

Primary Examiner—E. A. Goldberg
Assistant Examiner—Patrick W. Foster
Attorney, Agent, or Firm—Caesar, Rivise, Bernstein & Cohen

[57] ABSTRACT

An electronic scale device used for weighing an object or material. The device includes a platform arranged to move upon receipt of a material thereon. The device further includes variable capacitance means arranged to move upon receipt of a material thereon and comprising a first plate and a second plate with one of the plates being movable. Movement of the platform means upon receipt of the material thereon causes a displacement of the movable plate relative to the other plate to produce a signal indicative of the weight of the material being weighed. The displacement of the movable plate is achieved by having the movable plate rotate about a fixed axis of rotation. Moreover, the plates are disposed so as to be non-parallel to each other over the entire operational range of movement of the movable plate, whenever the plates are not abutting each other. In one embodiment of the invention, the distances between all points on one plate and their respective corresponding points on the other plate is proportional to the respective distances each of those points is from the axis of rotation, throughout the entire operational range of movement of the movable plate.

3 Claims, 6 Drawing Figures

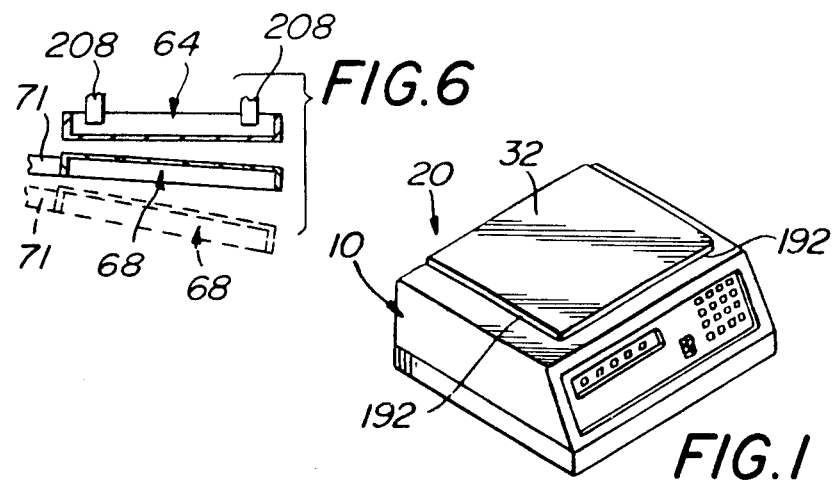
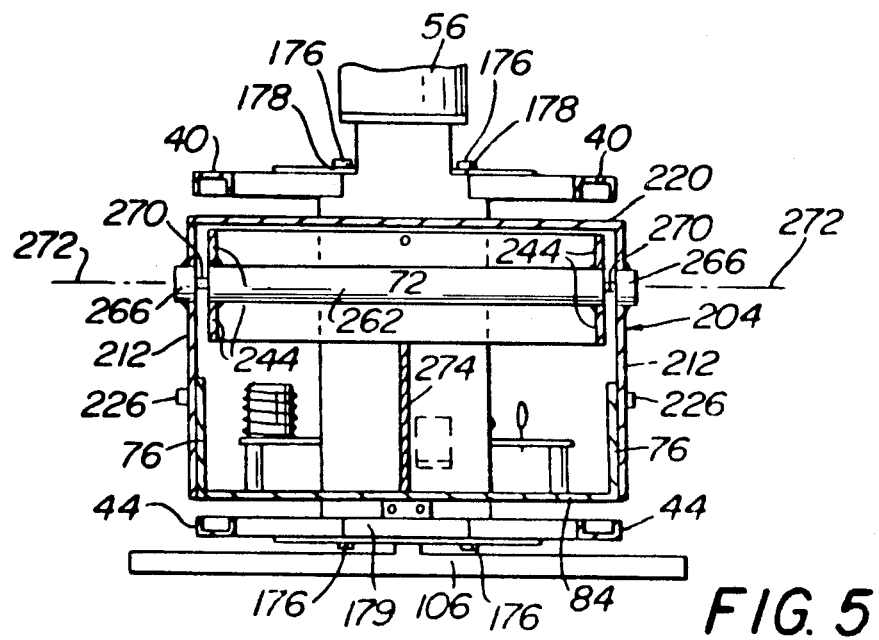

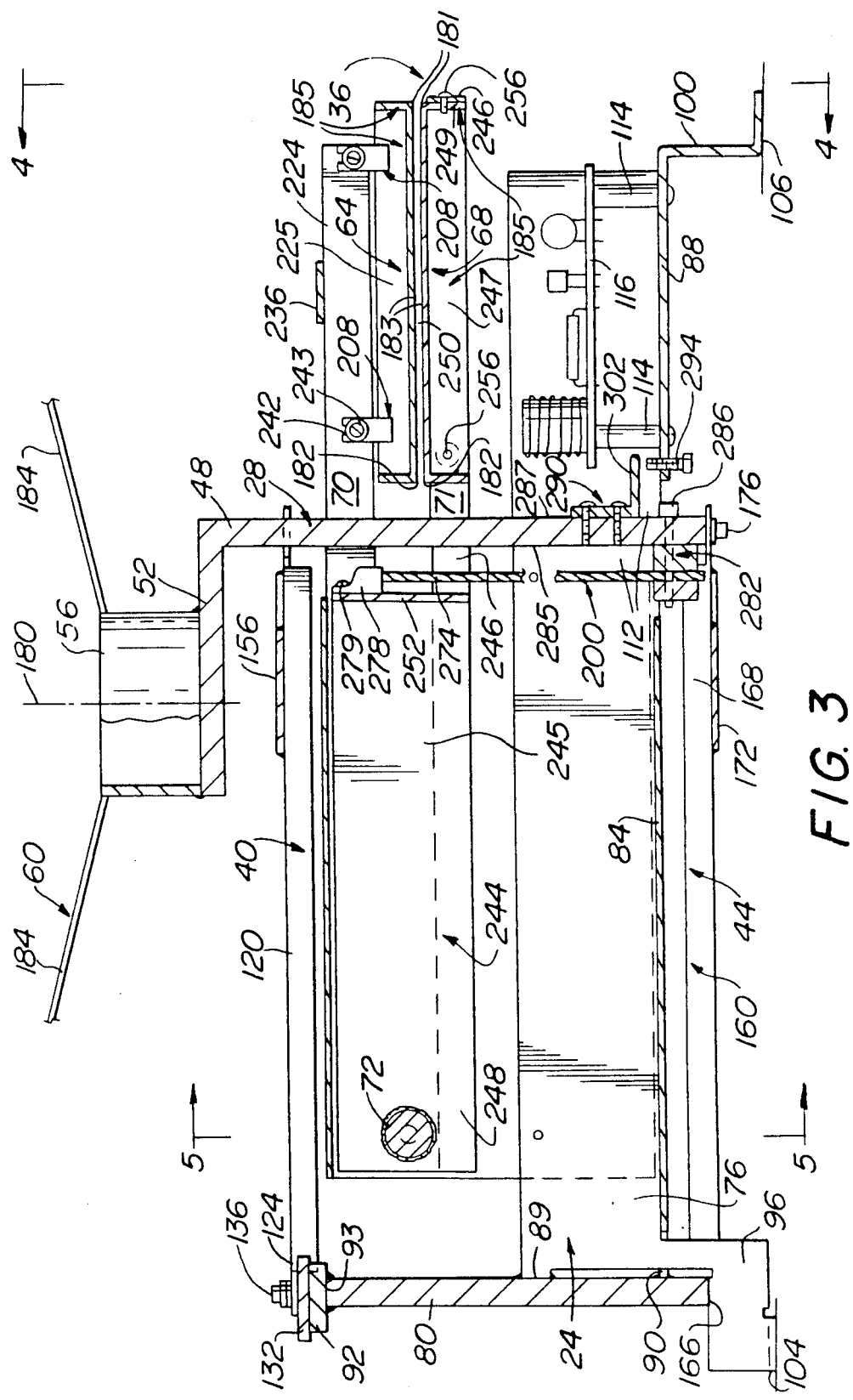

4,524,840

ELECTRONIC SCALE WITH NON-PARALLEL CAPACITANCE MEANS

BACKGROUND OF THE INVENTION

This invention relates generally to measuring apparatus and more particularly to an electronic scale device.

Various electronic scales are commerically available for providing a digital display of the weight of a body placed on a weighing pan. Many of the recently developed scales make use of integrated circuits and microcomputer controls for perfecting various scale operations such as weighing, counting, altering resolution, converting units, etc. In this regard, these devices comprise electronic circuitry usually including a movable transducer and mechanical interfacing means between the electronic circuitry and the weighing pan. The mechanical interfacing mean generally comprises some form of spring means for biasing the pan in a direction opposite to that of the gravitational force exerted upon the pan by the load being weighed.

The movable transducer is typically a variable capacitor comprising a pair of electrically conductive plates, whereby a change in capacitance is effected by moving one of the plates either closer to or further away from the other of the plates responsive to weight being added to or removed from the pan, respectively. In this regard, the variable capacitors used in the prior art generally utilize both a movable plate and a stationary plate such that the movable plate is adjusted to be parallel to the stationary plate when the scale is in a null or starting position (e.g., when no weight is on the scale's weighing pan).

In many of these prior art devices, although the capacitor plates are parallel to each other when the scale is in a null position, the movable plate is arranged to pivot about a rotational axis, thus causing the respective plates to be non-parallel with respect to each other when a load is added to the weighing pan. In this regard, it should be appreciated by those skilled in the relevant art that a scale comprising a variable capacitor constructed of plates which move from a parallel to a non-parallel orientation, although perhaps generally suitable for its intended purpose, requires that rather complex and time consuming mathematical computations be performed in order to relate the amount of weight of the object on the weighing pan to a given change in capacitance. In addition, the process of calibrating the scale tends to be complex and correspondingly time consuming.

Some of the other prior devices not only use capacitors which include plates which pivot from a parallel to a non-parallel orientation but also comprise rotational means which causes at least one of the plates to rotate about a movable as opposed to a fixed axis of rotation. Obviously, this results in the device having to perform mathematical computations of even greater complexity.

In this regard, U.S. Pat. No. 4,273,204 (Gillen) discloses a capacitive weighing scale utilizing a spring which biases a movable capacitor plate against the force of the load being weighed. Although the Gillen device is generally suitable for its intended purpose, its spring comprises a bendable "C"-shaped steel member which orients the respective plates parallel to each other under a first load condition and non-parallel to each other under other load conditions. Furthermore and as should readily be appreciated from the Gillen drawing, the movable plate of the Gillen device rotates about a non-stationary as opposed to a fixed axis of rotation, thus further increasing the complexity of the mathematical operations which must be performed.

Various prior art devices have been constructed in an attempt to simplify the mathematics involved. Certain of these devices utilize a variable capacitor comprising plates which remain parallel to each over their entire operational range of movement. Although this arrangement is generally suitable for its intended purpose, its implementation typically entails a rather complex and correspondingly expensive mechanical arrangement. Other prior art devices attempt to simplify the mathematical complexities by utilizing unusually shaped capacitor plates, e.g., triangular plates. These devices have also tended to be unduly complex in construction and furthermore, the simplified mathematical computations have generally only applied over a limited operational range of movement of the capacitor plate(s).

OBJECTS OF THE INVENTION

Accordingly, it is a general object of the invention to provide an electronic scale which overcomes the disadvantages of the prior art.

It is another object of the invention to provide an electronic scale which utilizes a variable capacitor having non-parallel disposed deflecting plates to effect measurement.

It is a further object of the invention to provide an electronic scale which utilizes a variable capacitor having a movable plate and a stationary plate such that the two plates are disposed non-parallel to each other over their entire operational range of movement, with the movable plate rotating about a fixed axis of rotation so as to simplify the mathematical computations required in order to determine the weight of an object on the scale's weighing pan.

It is still a further object of the invention to provide an electronic scale which utilizes variable capacitance means constructed of non-parallel disposed pivoting plates so as to simplify and thus expedite the process by which the scale is calibrated by its user.

It is still a further object of the instant invention to provide an electronic scale which is durable, relatively simple in construction and may readily be used for accurately and reliably weighing a material or object.

SUMMARY OF INVENTION

These and other objects of the instant invention are readily achieved by providing a scale which can be used to weigh or otherwise measure certain other parameters of an unknown material or object. The device includes frame means, platform means arranged to move upon receipt of a material thereon and variable capacitance means coupled to the platform means. The variable capacitance means includes a first plate and a second plate with one of the plates being movable. Movement of the platform means upon receipt of the material thereon causes a displacement of the movable plate relative to the other plate to produce a signal indicative of the weight of the material being weighed. The displacement of the movable plate is achieved by having the movable plate rotate about a fixed axis of rotation. Moreover, the plates are disposed so as to be non-parallel to each other over the entire operational range of movement of the movable plate, whenever the plates are not abutting each other. In one embodiment of the invention, the distance between all points on one plate and their respective corresponding points on the other plate is proportional to the respective distances each of those points is from the axis of rotation, throughout the entire operational range of movement for the movable plate.

DESCRIPTION OF THE DRAWING

Other objects and many of the attendant advantages of the invention are readily appreciated as the same becomes better understood by reference to the following detailed description when considered in connection with the accompanying drawing wherein:

FIG. 1 is a perspective view of an electronic scale constructed in accordance with the instant invention;

FIG. 3 is an enlarged sectional view taken along line 3—3 of FIG. 2;

FIG. 5 is a reduced sectional view, partially broken away, taken along line 5—5 of FIG. 3.

FIG. 6 is an enlarged, fragmentary sectional view illustrating, in solid line representation, the orientation of the plates when there is no load on the scale, and illustrating the position of the bottom plate, in phantom representation, when a load is placed on the scale, said illustration being exaggerated for purposes of clearly showing the non-parallel relationship existing between the plates.

DETAILED DESCRIPTION OF PREFERRED EMBODIMENT

Figure 2:
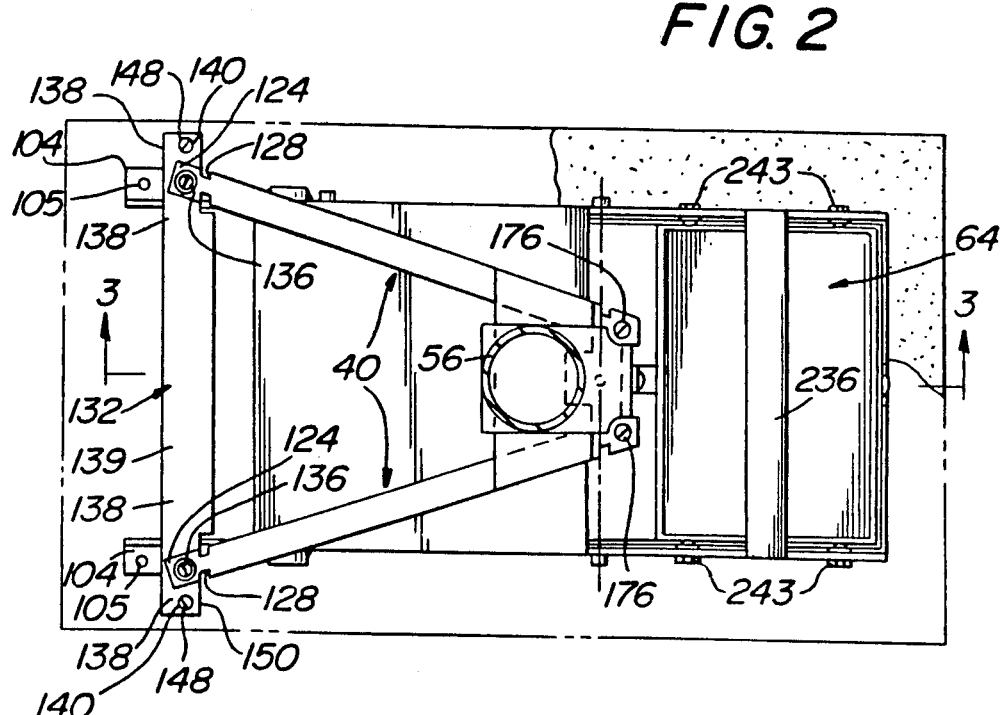
FIG. 2 is a top plan view of the electronic scale shown in FIG. 1 with the casing and platform removed.

Referring now to the various figures of the drawing wherein like reference characters refer to like parts, there is shown at 20 in FIG. 1 an electronic scale constructed in accordance with the instant invention.

Although the deive 20 is referred to as a "scale" throughout this patent application, it should be understood that the instant invention is not limited to that of a "weighing" device but can also be used for determining the mass, density, volume and other parameters of a liquid or solid, whenever weight can be used as a factor in making such a determination. In this regard, the utilization of the scale 20 for purposes other than "weighing" is shown and described in my prior U.S. Pat. No. 4,372,405, which issued on Feb. 8, 1983, and whose disclosure is hereby incorporated by reference, herein.

It should also be pointed out at this juncture that the instant invention relates not to the scale's electronic circuitry in general, which is conventional, but to the transducer means (e.g., variable capacitor) and the means for mounting the same to the frame of the device in order to achieve greater measuring accuracy and simplified computational operations. To that end, the scale 20 is a self-contained, solid state device which is readily used for measuring the weight or other parameters on an unknown liquid or solid and for providing a digital reading thereof. The device 20 basically comprises a frame assembly 24 (FIG. 3) for supporting various mechanical and electrical components within the scale's casing 10, a suspension system 28 mounted on the frame assembly and supporting the platform or pan 32 (FIG. 1), and displacement responsive transducer means 36 coupled to the suspension system and thus to the pan.

The details of the frame assembly 24 and suspension system 28 will be described later, but suffice it for now to state that the suspension system 28 basically comprises upper and lower parallelogram members 40 and 44 respectively, and an interconnecting vertical column 48. An arm 52 extends horizontally from the top of the column 48 just above the upper parallelogram 40. A tubular column 56 is mounted on the arm and terminates at its upper end in a spider 60, upon which the pan 32 is mounted.

The transducer means 36 will be described in detail later, but basically comprises a variable capacitor including an upper plate 64 and a lower plate 68. Although it can not readily be seen in FIG. 3 of the drawing due to the small distances involved, the lower plate is positioned so as to be slightly non-parallel with respect to the upper plate in a null position, (e.g., when no load is on the pan). This non-parallel relationship, with no load on the pan, is shown in exaggerated form in solid line representation in FIG. 6. Furthermore, the lower plate is designed to rotate about a fixed axis so as to be displaced either upward or downward with respect to the upper plate when the pan is loaded or unloaded, as the case may be. A displaced orientation of the lower plate 68, when a load is on the pan, is shown in phanton representation in FIG. 6, with the orientation being exaggerated for purposes of clarity. The upper plate is fixedly connected to the frame assembly 24, via upper plate support means 70, while the lower plate is mounted on the frame assembly by lower plate support means 71 and spring means 72. The lower plate 68 is also coupled to the pan 32 by the column 56, the arm 52, the column 48 and other elements of the suspension system 28, to be described later.

The spring means 72 comprises a rod or bar which is arranged to twist in order to permit displacement of the lower plate 68 relative to the upper plate 64. In this regard, the lower plate pivots about the central axis of the spring means 72 so that its displacement relative to the upper plate is in a rotational as opposed to translational direction, as shall be described in greater detail later.

Suffice it for now to state that the non-parallel plate arrangement serves to simplify the mathematical complexities required in order to relate the displacement of the lower plate to the weight of the object on the pan. This arrangement also serves to substantially reduce the complexity of the process by which the scale is calibrated by the user of the device.

The use of parallelogram members 40 and 44 in a scale suspension system is a conventional technique to insure that only the vertical component of the load is transferred to the pan's displacement detecting means. In the case of this invention, the parallelogram members 40 and 44 and associated components of the suspension system perform that same function. Therefore, only the vertical component of the load of the pan is transmitted to the lower capacitor plate 68 by the suspension system. Moreover, the suspension system counteracts all side loads and twisting moments (which might be applied to the pan) and rigidly resists all motions except for up/down movement.

The plates 64 and 68 of the capacitor 36 are connected by electrical conductors (not shown) to the input of a variable frequency oscillator. The oscillator produces an electrical signal whose output frequency is a function of the capacitors of the capacitor 36 and hence, a function of the vertical displacement of the weighing pan 32. The electrical signal from the variable frequency oscillator is acted upon by the electronic circuitry of the device 20 to provide a reading of weight, volume or density of the material placed on the pan. In this regard, the electrical circuitry of the apparatus is not generally shown or described in this application but is set forth in greater detail in my above identified prior patent.

Figure 4:
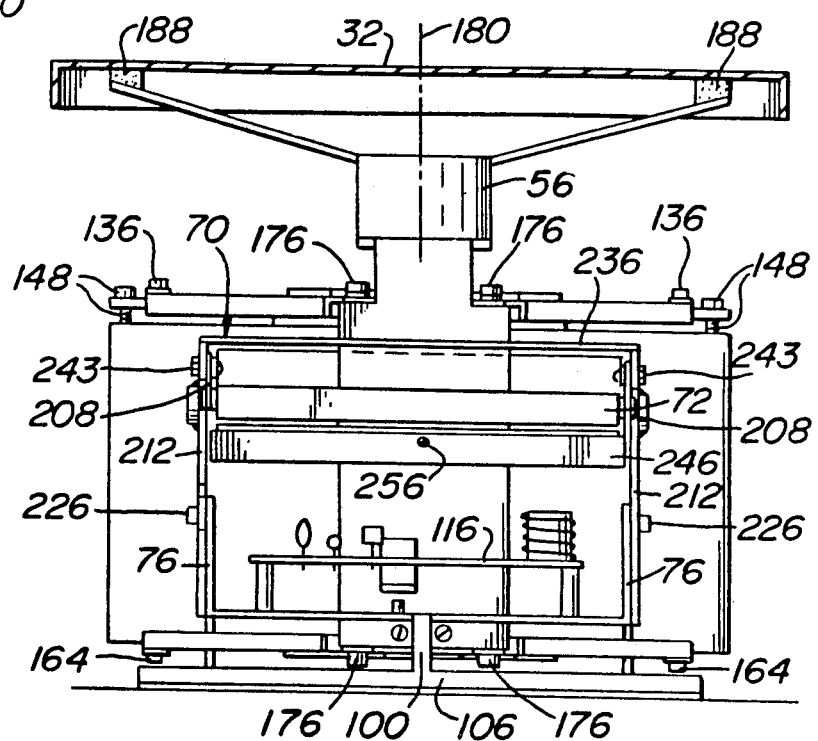
FIG. 4 is a reduced sectional view taken along line 4—4 of FIG. 3.

Referring now to the various Figures of the drawing, the details of the suspension system 28, the frame assembly 24, the capacitor 36, and the mounting means for the capacitor will be described in detail. Thus, as seen in FIGS. 2, 3 and 4 the frame assembly 24 is generally rectangularly shaped and is made up of plural bar-like, frame elements, namely a pair of side frame elements 76 (FIG. 4), an end frame element 80 (FIG. 3), a primary cross-frame element 84 (FIG. 3), a secondary cross-frame element 88 (FIG. 3) and the upper plate support means 70 (FIG. 3), as will be described later.

Referring to FIG. 3, the side frame elements 76 are attached (e.g., welded) at right angles to the end frame element 80. The respective connections are made along vertically disposed joints 89 on the front planar surface of the end frame element. The end frame element 80 is also connected by similar means to the cross-frame element 84 along a joint 90. The connections between the end frame element and the side frame elements and cross-frame element insure that the side frame elements are rigid with respect to the end frame element in the up/down direction.

The end frame element 80 includes a spacer bar 92 fixedly secured at its mid-portion along the top edge 93 of the element 80. The spacer bar 92 operates in combination with a flexible adjustment bar (to be described later) to enable adjustment of the upper parallelogram assembly 40.

The primary cross-frame element 84 and the secondary cross-frame element 88, each comprise a generally rectangular, planar bar, which interconnects the bottom edges of the respective side frame elements 76. The primary cross-frame element 88 is connected to the respective side frame elements adjacent the rear portion of the scale (e.g., beneath the upper parallelogram assembly 40) and the secondary cross-frame element 88 is connected to the side frame elements adjacent the front portion of the scale (e.g., generally beneath the variable capacitor 36). Furthermore, there is a space between the respective cross-frame members, as shall be described later.

The device 20 is supported by a set of legs arranged in a tripod configuration. The set of legs includes a pair of rear legs 96 and a front leg 100. Each rear leg 96 extends vertically and is formed integrally with a respective side frame element 76. Each leg also includes a generally horizontal foot 104, having a mounting hole 105 (FIG. 2), which is used for bolting the scale 20 to a horizontal supporting surface (e.g., a cabinet).

The front leg 100 is formed integrally with the secondary cross-frame element 88 at a position midway between the respective side frame elements 76. The front leg 100 extends vertically downward and includes a generally horizontal foot 106 having a mounting hole (not shown) which is also used for mounting the scale 20 on a horizontal surface.

The suspension components are mounted on the frame assembly 24 located within a space between the end frame element 80 and the capacitor 36, with the upper parallelogram member 40 being located generally above the side frame elements 76, and the lower parallelogram 44 being located generally below the side frame elements. The area between the primary and secondary cross-frame elements 76 and denoted by the reference numeral 112, defines a space in which the interconnecting vertical column 48 is located.

The electrical components of the oscillator are located on a circuit board 116 which is mounted by standoffs 114 on the secondary cross-frame element 88 and between the respective side frame elements 76. The electrical components shown on the circuit board 116 are merely exemplary of the actual components used.

The upper and lower plates 64 and 68 of the capacitor are supported by the upper plate support means 70 and the lower plate support means 71, respectively, so as to locate the capacitor generally above the circuit board 116 and between the side frame elements 76.

The upper parallelogram member 40 comprises a pair of elongated legs 120, each of which is of U-shaped cross-section, except for its opposed end portions 124, (FIG. 2) which are planar. A pair of notches 128 are located in the opposed edges of the planar portions 124 to serve as flex points for the legs of the parallelogram.

In order to permit adjustment of the vertical angle of the legs of the upper parallelogram a flexible adjustment bar 132 is interposed between the planar end portions 124 of the upper parallelogram and the end frame element 80. The adjustment bar mounts the upper parallelogram and is constructed as a generally planar member which is flexible in the up/down direction and rigid in all other directions. Moreover, the adjustment bar 132 is upwardly biased at its respective ends 138. Thus, as can be seen in FIG. 2, the mid-portion 139 of the adjustment bar is attached (e.g., welded) to the top edge of the spacer bar 92 along the entire length of the spacer bar. The adjustment bar also includes a respective mounting hole 140 adjacent each of its ends, while the end frame element 80 includes a correspondingly located pair of internally threaded holes (not shown) along its top horizontal edge so as to permit respective bolts 148 to pass through the mounting holes 140 and engage the internally threaded holes of the end frame element.

Since the intermediate portion 139 of the adjustment bar is welded to the spacer bar and its respective ends are bolted to the end frame element as just described, the height of the respective ends is readily raised or lowered by tightening or loosening the adjustment bolts 148, as desired. As should be appreciated from the foregoing discussion, when the adjustment bolts 148 are loosened, the ends move upwardly under the upward bias force of the adjustment bar. Conversely, when the bolts are tightened, the ends of the bar are pulled downwardly toward the top edge of the end frame element 80 against the bias of the adjustment bar.

Each leg of the upper parallelogram is connected to the top surface of the adjustment bar 132 via respective bolts 136. In addition, the adjustment bar includes a pair of recesses 150 adjacent its respective ends to accommodate the downwardly directed portions of the U-shaped parallelogram legs. Since the legs 40 of the upper parallelogram are attached to the adjustment bar 132 adjacent the respective ends of said bar, the height of the ends and thus the vertical angle of the respective legs are readily adjusted by tightening or loosening the respective adjustment bolts as just described.

As can be seen in FIG. 2, the legs of the parallelogram 40 extend at an acute angle to each other, with the free ends of the legs being located in space 112. The free ends of the parallelogram legs are interconnected by means of a notched plate 156 (FIG. 3) which is attached to the top surface of the respective legs, adjacent the tubular column 56.

The lower parallelogram 44 is constructed in an identical manner to the upper parallelogram and includes a pair of legs 160 which are mounted at one end to the bottom horizontal edge 166 of the end frame element 80, via screws 164 (FIG. 4). The free end portion 168 of the legs of the lower parallelogram also terminate within the space 112 and directly below the free ends of the upper parallelogram legs. The free ends of the lower parallelogram legs include a notched plate 172 which is identically constructed and attached to the lower parallelogram legs as plate 156 is with regard to the upper parallelogram legs.

The interconnecting column 48 is a rigid, elongated, generally rectangular member which is mounted between the opposed free ends of the two parallelogram members, via respective bolts 176. The upper portion of the column 48 includes a pair of notched shoulders 178 (FIG. 5) to which the free ends of the upper parallelogram legs are bolted and a generally planar bottom edge 179 to which the free ends of the lower parallelogram legs are bolted.

The arm 52 is secured to the top of the interconnecting column 48 (i.e., above the shoulders 178) and as noted heretofore, extends parallel to the parallelogram legs. Moreover, the free end of the arm 52 is located approximately central with respect to the space 112. The tubular column 56 is mounted on the free end of the interconnecting arm 52, with the longitudinal axis of the column, denoted by the broken line 180, defining the center line for the apparatus pan 32.

The spider 60 includes four angularly extending arms 184 (only two of which are shown). Each arm terminates at its free end in a vibration-dampening cushion 188 (FIG. 4). The pan 32 is a generally planar member of rectangular shape and having a downwardly projecting flanged peripheral edge 192. The pan is arranged to be disposed on the vibration-dampening cushions 188 of the spider for support thereon.

As will be appreciated from the foregoing, when a body or load is placed on the pan, irrespective of its position on the pan, only the vertical component of the load is applied to the free end of the arm 52 along axis 180 (FIG. 4).

The details of the suspension system 28, the capacitor 36, the upper plate support means 70 and the lower plate support means 71 will now be described. The upper plate 64 of the capacitor 36, like the lower plate 68, is a generally planar metallic member, of generally rectangular shape. Each plate includes a far edge 181, a near edge 182 and a pair of parallel side edges 183, around which a flanged portion 185 is connected. The flanged portions of the upper and lower plates are connected to the respective support means 70 and 71 and to associated electrical conductors (not shown). Thus, the upper plate 64 is fixedly mounted to the frame 24 by the upper plate support means 70, while the lower plate 68 is pivotably connected to the frame assembly 24 by the lower plate support means 71 and the spring means 72. Furthermore, the lower plate is also coupled to the pan 32 via the vertical column 48, the suspension system 28 and a cable assembly 200.

The spring means 72 serves to bias the lower plate 64 upwardly towards the upper plate 64 to a neutral or null position against the downward urging of the suspension system and cable assembly when a load is placed on the pan. As will be described hereinafter, the greater the weight of the load on the pan the further the lower plate is displaced downward relative to the upper plate. This action thus increases the air gap between the capacitor plates, thereby decreasing the capacitance of the capacitor 36. The changed capacitance is sensed by the electronic circuitry to provide an indication of the weight on the scale's pan.

The upper plate support means 70 comprises an upper frame assembly 204 (FIG. 5) and a pluarlity of strap members 208 (FIG. 3). The upper frame assembly 204 is a very rigid one piece unit comprising a pair of vertical side walls 212, a bridging top wall 220 and a pair of arms 224 (FIG. 3) each projecting forward from an associated side wall 212. The side 212 are each connected to a respective side frame element 76 by mounting screws 226. The upper frame assembly 204 when mounted as just described is located between the upper and lower parallelogram assemblies, with each arm 224 extending from its respective side wall 212 in a generally co-planar, horizontal direction and disposed generally above the side edges of the secondary cross-frame element 88. A cross-bar 236 interconnects the respective arms 224 at an intermediate location to insure that the arms remain parallel and rigid with respect to each other.

The strap members 208 are thin strips which serve to suspend the upper capacitor plate from the arms 224. In this regard, each strap is bolted at one end to a respective arm 224 and is adhesively secured at its opposite end to an insulator (not shown) which is adhesively secured to a lateral side portion 225 of the flange 185 of the upper capacitor plate. In the preferred embodiment of the invention, four such straps are used, with two straps being attached to each side portion 225 and arranged so that there is a strap situated adjacent each of the four respective corners of the upper plate.

Referring to FIG. 3, each strap is a very thin, planar and generally rectangular member having a U-shaped slot 242 adjacent its upper end. Each slot serves as a mounting opening for securing the strap onto the end being connected to the upper frame assembly arm 224 via an associated bolt 243. The U-shaped slot permits adjustment of the position and angle of the upper plate by varying the position of the straps relative to the arm 224. Thus, the gap 250 between the upper and lower plates can readily be adjusted or calibrated by loosening the mounting bolts, accurately positioning the capacitor plate and then tightening the bolts.

Referring to FIG. 3, the lower plate support means 71 is mounted on the frame by the spring 72 (as will be described later) and basically comprises a generally rectangular support bracket 244. The support bracket 244 is constructed of a relatively thick walled base portion 245 and a pair of projecting arms 246. The thick base portion 245 is very rigid, particularly in the up/down direction so as to minimize the effects of non-torsional stresses and strains which may be encountered. The base portion comprises a pair of parallel side walls 248 which are disposed generally parallel to and adjacent (but free of contact with) the side walls of the upper plate supporting bracket 70. The side walls are interconnected by means of a thick vertical front wall 252 which is disposed generally parallel and adjacent the vertical column 48.

The arms are each thin elongated planar strips extending horizontally in a vertical plane from the sidewalls of the base 244. Thus each arm is rigid in an up/down direction, but flexible in all other directions. Each arm is attached (e.g., welded) to the outer surfaces of the respective side walls 245 of the base portion 248. The outermost end of the arms are joined by a bridging strip integrally formed with the arm to form a generally "U"-shaped configuration. This U-shaped projection is configured to encircle the periphery of the lower capacitor plate 68 (e.g., its flanged portion 185) to serve as the mounting means therefore. Thus, respective portions of the strap are parallel to the respective side portions 247 and front portion 249 of the flanged portion 185 of the lower plate and are attached thereto by a set of three mounting screws 256. Each of the three mounting screws connects a portion of the strap to the left side, right side, and front flange, respectively, of the lower capacitor plate.

As mentioned earlier, the support bracket 244 (FIG. 5) is mounted to the upper frame assembly 204 by the spring means 72. The spring means 72 basically comprises an elongated cylindrical member or bar formed of a strong, yet resilient metal, (e.g., stainless steel), and having a pair of reduced diameter neck sections 270, each adjacent a respective end 266 of the bar. Each end 266 of the bar is fixedly secured to a respective sidewall 212 of the upper frame assembly. The reduced diameter neck portions 270 are of substantially smaller cross-section than the remainder of the bar 72 and thus serve as the actual spring means of the device since they serve as the twist situs when a torque is applied to the intermediate portion 262 of the bar relative to the end portions thereof. In this regard, each neck portion is of relatively short length (e.g., approximately 2½ times its diameter) to minimize any bending which might occur along these portions. However, as a practical consideration the shortness of these portions is limited by the fact that the shorter the length, the greater is the twist per unit of length and stress.

The securement of each end of the bar 72 is as follows: the outer portions 266 of the bar extend through respective holes in the side wall 212 of the upper frame assembly and are welded in place. The sidewalls 244 of the lower capacitor support bracket are also fixedly secured to the bar 72. The that end, portions of the the intermediate portion 262 of the bar contiguous with each neck portion extend through an associated bore in an associated side wall 244 of the lower capacitor support bracket and are fixedly attached, (e.g., welded) thereto.

As a result of the foregoing arrangement, it should be appreciated that inasmuch as the reduced thickness (cross section) portions 270 are of lesser cross-section than the other portions of the bar 72, when the force is applied to the lower capacitor plate mounting bracket 244 as a result of weight being added to the pan 32, the reduced thickness portions 270 of the torsion bar 72 rotate or twist evenly about the longitudinal central axis 272 of the bar. Thus, the intermediate portion 262 of the bar rotates along with the lower capacitor plate mounting bracket 244, relative to the end portions 266 of the bar and the upper frame assembly 204.

It should further be appreciated that when weight is removed from the pan, the biasing tension of the bar causes the bar to twist in the opposite direction (e.g., toward an untwisted position or state), resulting in the lower plate support means 71 and lower capacitor plate 68 pivoting in a generally upward direction. Thus the lower plate pivots towards the upper plate to produce a corresponding change in capacitance to indicate a reduced amount of weight on the pan 32.

In accordance with the teachings of this invention, the upper plate 64 is adjusted so that when the lower plate is in the null or neutral position (e.g., when no load is resting on the pan 32), the planar surfaces of the respective plates are adjusted so as not to be parallel with respect to each other. In this regard, in the preferred embodiment of the invention, the upper plate 64 and lower plate 68 are each situated along respective planes which intersect along the rotational axis 272 of the spring means 72. Thus, although not clearly shown in the various figures of the drawing, the gap 250 is widest adjacent the far edges 181 of the respective plates and narrowest adjacent their near edges 182 when the device is in a neutral or null position. Moreover, not only are the plates disposed in respective planes which intersect along the rotational axis 272 when the device is in a null position, but these respective planes intersect along the rotational axis 272 throughout the entire operational range of movement of the lower plate, as it is displaced relative to the upper plate.

As a result of the above described geometric configuration, it should readily be appreciated that the distance or gap between the respective near edges 182 of the upper and lower plates respectively divided by the distance or gap between the respective far edges of the upper and lower plates is substantially equal to the distance the near edges are from the pivot axis 272 divided by the distance the far edges 181 are from the same pivot axis. This mathematical relationship is applicable over the entire operational range of movement of the lower capacitor plate. In symbolic form this relationship is written as follows:

$$\frac{d_1}{d_2} \approx \frac{l_1}{l_2}$$

where, $d_1$ = the distance between the respective near edges;
$d_2$ = the distance between the respective far edges;
$l_1$ = the distance between the near edges and the axis of rotation; and
$l_2$ = the distance between the far edges and the axis of rotation.

Furthermore, in slightly different form this relationship can be described as follows: the distance between all of the points on one of the plates and their respective corresponding points on the other of the plates is substantially proportional to the distance each respective point is from the axis of rotation, over the entire operational range of movement of the lower plate.

Accordingly and as a result of the geometric relationship between the respective plates, the capacitance of the capacitor 36 bears a simple mathematical relationship to the distance the lower plate is displaced relative to the upper plate.

To that end, the change in capacitane of the capacitor 36 associated with either an upward or downward displacement of the lower plate is calculated by using essentially the same mathematical equation used for calculating the change in capacitance of a capacitor having parallel plates which remain parallel as they are displaced towards or away from each other. In contradistinction thereto, prior art weighing scales comprising a capacitor whose plates are disposed parallel to each other in a null or first position and non-parallel to each other under other conditions (e.g., when a load is place on its weighing pan), require the utilization of a rather complex mathematical equation in order to relate a change in capacitance to the displacement of the capacitor's plates and thus, the weight of the load on the pan.

More specifically, the capacitance of a variable capacitor having parallel plates which remain parallel as one or both of the plates is displaced is mathematically represented as follows:

$$C = \frac{.225 A}{d_o + \Delta d}$$

where,

C = the capacitance;
A = the area of the respective capacitor plates;
$d_o$ = the initial distance between the two capacitor plates; and
$\Delta d$ = the distance the movable plate is displaced from the starting position in the direction away from the fixed capacitor plate.

(It should also be appreciated that "$\Delta d$", which is the displacement of the movable plate, is equal to a constant "K" times the weight on the pan "F".)

In comparison to the above, the Applicant's scale, which utilizes a capacitor 36 having plates which are situated along respective planes which intersect along a rotational axis (e.g., axis 172), has a capacitance which is mathematically represented by the following equation:

$$C = \frac{K_1}{K_2 + K_3 F}$$

where,

C = the capacitance of the capacitor;
$K_1$ = a first constant
$K_2$ = a second constant
$K_3$ = a third constant
F = the force applied to the spring by the load being weighed.

As a result, it should readily be appreciated that by substituting a first constant "$K_1$" for 0.225 times the plate's area, "A"; a second constant "$K_2$" for the distance between the respective plates at the starting or null position, "$d_o$"; and "$K_3 F$", a constant times the Force "F" of the load against the spring, for the displacement, "$\Delta d$", the mathematical equation for determining the capacitance of a capacitor having parallel disposed and displaced plates is identical in form to the equation used for determining the capacitance of a capacitor constructed in accordance with the Applicant's teachings (e.g., capacitor 36).

Thus, notwithstanding the fact that the lower plate 68 is not parallel to the upper plate 64 and is displaced about a rotational axis, the capacitance of capacitor 36 is readily determined using a relatively simple mathematical equation, as though the capacitor 36 were constructed having parallel, displacable plates.

For purposes of comparison, a capacitor having plates which are adjusted parallel to each other in the null position but which are designed to be displaced in a non-parallel fashion about a rotational axis upon receipt of a load on the scale's weighing pan (e.g., as is typically done in prior art devices), would have a capacitance which is calculated using complex mathematical formula typically requiring the solution of a natural logarithmic equation(s).

The cable assembly 200 which serves as means for coupling the lower plate support means 71 to the vertical column 48 and hence to the pan 32 shall now be described. As best shown in FIG. 3, the cable assembly 200 basically comprises a metal, non-stretchable cable 274, an upper clamp assembly 278 and a lower clamp assembly 282. The upper clamp assembly 278 is threadedly attached by a screw 279 to the front surface of the front wall 252 of the lower plate support means 71 at a central position with respecct thereto. The cable 274 is fixedly secured to the upper clamp assembly 278 in a conventional fashion. The lower end of the cable is secured by the lower clamp assembly 282 to the lower portion of the vertical column 48. In this regard, the lower clamp assembly 282 is attached to the vertical column 48 at a central position with respect to the column 48. The lower clamp assembly 282 includes a central opening through which the lower end of the cable passes and is secured by two perpendicularly disposed screws 286. The screws engage the clamp assembly 282 to hold the cable in place and when the screws are loosened, one can vary the effective length of the cable to approximately set the gap between the two capacitor plates. However, the precise size and angle of the gap 250 between the plates, is adjusted as mentioned before, by loosening the bolts 243 and moving the straps 208.

As can be seen in FIG. 3, the lower clamp assembly 282 is constructed to situate the end of the cable to which it is connected, a predetermined horizontal distance from the rear planar surface 285 of the vertical column, to dispose the cable vertically within the space 112, between the front wall 252 and the vertical column 48.

In view of the foregoing discussion and description, it should readily be appreciated that movement of the vertical column 48 in a downward direction pulls the cable 274 in a downward direction. Since the cable 274 is connected to the front plate 252 of the lower capacitor mounting bracket 244, downward movement of the cable pulls downwardly on the front plate 252 of the lower capacitor mounting bracket, causing the reduced thickness portions 270 of the bar to twist and the mounting bracket to pivot downwardly about its central or rotational axis 272. The downward rotation of the mounting bracket causes the planar surface of the lower capacitor plate to move in a generally downward direction, thus increasing the gap 250 between the upper and lower plates.

Conversely, movement of the vertical column 48 in an upward direction reduces the tension in the cable 274 enabling the bar 72 to untwist (e.g., move towards an untwisted equilibrium state), resulting in the lower capacitor mounting bracket 244 pivoting upwardly. Upward pivoting of the bracket 244 causes the lower plate 68 to move upwardly so as to reduce the size of the gap 250 between the respective plates 64 and 68.

It should be appreciated that in a commercial embodiment of the device 20, its electronic circuitry is calibrated so that when the spring means 72 is at equilibrium under the weight of an empty weighing pan 32, the display means indicates a weight of zero. Furthermore, in its preferred embodiment, the scale is constructed so that even when there is no load on the pan 32, there will still remain a gap 250 between the respective capacitor plates 64 and 68.

In order to prevent overtravel of the lower capacitor plate downward, the vertical column 48 further includes a stop member 290 (FIG.3) which coacts with a set screw 294 to limit the downward vertical movement of the column. The stop member 290 comprises an "L"- shaped bracket which is bolted to the front surface 287 of the vertical column at a slightly off center position. The free end of the set screw 294 is threaded through the secondary cross-plate 88 and extends a predetermined distance upwardly therefrom, to engage a horizontal leg 302 of the bracket 290 at the downward most position of the front plate.

As should be appreciated by those skilled in the art the maximum amount of weight which can be placed on the pan can be readily adjusted within predetermined limits by rotating the set screw 294 to either increase or decrease how far its free end extends above the secondary cross bar 88.

The electrical components as shown in the various Figures. of the drawing, are generally exemplary of components used in an actual embodiment of the device, are of conventional construction and arrangement and are more fully described in the disclosure of my above mentioned patent. Thus, the actual electronic components and circuitry need not be described in detail herein. Suffice it to state for now that the electrical components include variable frequency oscillator means which produces an electrical signal whose frequency corresponds to the electrical capacitance of the capacitor 36. This electrical signal is readily used for producing another signal indicative of the weight or other measurements relating to the object on the weighing pan 32. Additionally, the electrical components of the scale 20 include solid state memory or storage means and microprocessor means, including an algorithm compliment for effecting the various calculations and routines required. Thus, such storage means includes an algorithm which compensates for capacitance variations resulting from various environmental or internal changes which might occur.

As will be appreciated from the foregoing, the instant invention provides means for measuring the weight of an unknown object with great accuracy and precision.

Without further elaboration, the foregoing will so fully illustrate my invention that others may, by applying current or future knowledge readily adapt the same for use under various conditions of service.

I claim:

1. An electronic scale comprising frame means, platform means arranged to move upon receipt of some material thereon, spring means coupled both to said frame means and to said platform means, variable capacitance means including a first plate and a second plate, with one of said plates being movable so that movement of said platform means upon receipt of said material thereon causes a displacement of said movable plate reltive to the other of said plates to produce a signal indicative of the weight of said material, said displacement being achieved by said movable plate rotating about a fixed axis of rotation, with said plates being out of engagement with each other and being disposed non-parallel to each other over the entire operational range of movement of said movable plate and with the distance between all of the points on one of said plates and their respective corresponding points on the other of said plates being substantially proportional to the distance each respective point is from the axis of rotation over said entire operational range of movement of said movable plate.

2. The scale of claim 1 wherein the respective planes of each of said plates intersect along said fixed axis of rotation.

3. The scale of claim 2 wherein said fixed axis of rotation is the central axis of said spring means.

* * * * *